US012803423B2

(12) United States Patent
Lin et al.

(10) Patent No.: US 12,803,423 B2
(45) Date of Patent: Nov. 17, 2026

(54) POWER SUPPLY SYSTEM WITH POWER FACTOR CORRECTION(PFC) AND CONTROL METHOD THEREOF

(71) Applicant: Richtek Technology Corporation, Zhubei City (TW)

(72) Inventors: Tzu-Chen Lin, Hsinchu (TW); Chih-Wei Chi, New Taipei (TW); Kun-Yu Lin, Hsinchu (TW); Shih-Ho Hsu, Hsinchu (TW)

(73) Assignee: Richtek Technology Corporation, Zhubei City (TW)

( * ) Notice: Subject to any disclaimer, the term of this patent is extended or adjusted under 35 U.S.C. 154(b) by 204 days.

(21) Appl. No.: 18/815,849

(22) Filed: Aug. 27, 2024

(65) Prior Publication Data

US 2025/0253764 A1 Aug. 7, 2025

Related U.S. Application Data

(60) Provisional application No. 63/548,973, filed on Feb. 2, 2024.

(30) Foreign Application Priority Data

Jun. 11, 2024 (TW) ................................ 113121539

(51) Int. Cl.

| | |
|---|---|
| ***H02M 1/00*** | (2007.01) |
| ***H02M 1/42*** | (2007.01) |
| ***H02M 3/335*** | (2006.01) |

(52) U.S. Cl.

CPC ....... *H02M 1/4208* (2013.01); *H02M 1/0016* (2021.05); *H02M 1/0048* (2021.05); *H02M 3/33507* (2013.01); *H02M 3/33571* (2021.05); *H02M 1/007* (2021.05); *Y02B 70/10* (2013.01)

(58) Field of Classification Search

CPC ............ H02M 1/4208; H02M 1/0016; H02M 1/0048; H02M 3/33507; H02M 3/33571; H02M 1/007; H02M 1/4225; Y02B 70/10

See application file for complete search history.

(56) References Cited

U.S. PATENT DOCUMENTS

| | | | | |
|---|---|---|---|---|
| 6,768,655 | B1 | 7/2004 | Yang et al. | |
| 11,411,489 | B2 | 8/2022 | Yang et al. | |
| 2010/0253305 | A1* | 10/2010 | Melanson ........... | H02M 1/4225 323/282 |

(Continued)

*Primary Examiner* — Crystal L Hammond
*Assistant Examiner* — Jonathan Walter Soileau
(74) *Attorney, Agent, or Firm* — Tung & Associates

(57) ABSTRACT

A power supply system with power factor correction (PFC) comprises an AC rectifier, a power factor correction (PFC) conversion circuit, a DC-DC converter, a protocol power delivery (PD) interface and a controller. The AC rectifier is used to rectify the AC input power to generate rectified power. The PFC conversion circuit is used to perform PFC conversion on the rectified power to generate converted power. The DC-DC converter is used to perform DC-DC conversion on the converted power to generate adapter output power. The protocol power delivery interface is used to determine the adapter output power according to a protocol information and control a power path switch to deliver the adapter output power to a power supply pin. The controller determines the converted voltage according to the rectified voltage and the adapter output voltage.

18 Claims, 5 Drawing Sheets

(56) References Cited

U.S. PATENT DOCUMENTS

| | | | | |
|---|---|---|---|---|
| 2022/0302846 | A1 | 9/2022 | Liu et al. | |
| 2023/0129443 | A1 * | 4/2023 | Liu .......................... | H02M 3/01<br>363/21.12 |
| 2025/0149992 | A1 * | 5/2025 | Xu .......................... | H02M 1/08 |

* cited by examiner

POWER SUPPLY SYSTEM WITH POWER FACTOR CORRECTION(PFC) AND CONTROL METHOD THEREOF

CROSS REFERENCE

The present invention claims priority to U.S. 63/548,973 filed on Feb. 2, 2024 and claims priority to TW 113121539 filed on Jun. 11, 2024.

BACKGROUND OF THE INVENTION

Field of Invention

The present invention relates to a power supply system with power factor correction (PFC); particularly, it relates to such power supply system with PFC which determines whether to disable a PFC conversion according to an adapter output power. The present invention also relates to a control method of the power supply system.

Description of Related Art

Referring to FIG. 1A, FIG. 1A illustrates a schematic diagram of a prior art power supply system 100. As shown in FIG. 1A, the prior art power supply system 100 includes an AC rectifier 1, a power factor correction (PFC) conversion circuit 10, a flyback power converter 15, and a communication protocol power delivery (PD) interface 40. The AC rectifier 1 rectifies an AC input voltage VAC to generate a rectified voltage VBD. The power factor correction conversion circuit 10 is configured to perform power factor correction conversion to convert the rectified voltage VBD to generate a power factor correction converted voltage VPFC. The power factor correction conversion circuit 100 includes a boost power stage circuit to boost the rectified voltage VBD to the PFC converted voltage VPFC, wherein the power factor correction conversion circuit 10 is used to correct the power factor of the power supply system 100.

Referring to FIG. 1B, FIG. 1B is a waveform diagram of the rectified voltage VBD and the PFC converted voltage VPFC in the prior art power supply system. As shown in FIG. 1B, after rectification by the AC rectifier 1, the waveform of the rectified voltage VBD is a full-wave rectified sinewave above zero. The PFC conversion voltage VPFC generated by performing PFC conversion through the power factor correction conversion circuit 10 is a DC voltage, wherein the PFC conversion voltage VPFC is usually a fixed value higher than the peak value of the rectified voltage VBD.

The flyback power converter 15 is configured to convert the PFC converted voltage VPFC to generate an adapter output voltage VDD through a DC-DC conversion manner to supply electrical power to the communication protocol PD interface 40. The communication protocol PD interface 40 is configured to transmit related information to the DC-DC flyback power converter 15 according to a first communication protocol information PRT1, thereby determining the adapter output voltage VDD. The communication protocol PD interface 40 also controls the power path switch MBUS therein to transmit the adapter output voltage VDD to a power supply pin VBUS therein, thereby supplying the adapter output voltage VDD to circuits (not shown) coupled externally. The aforementioned power supply system 100 is commonly used for traditional traveler adapters that output relatively fixed power and output voltage.

For a traveler adapter complying with the latest Universal Serial Bus Power Delivery (USBPD) specifications, it needs to provide output power ranging from 5 V/5 A (equivalent to 25 W) to 20V/5 A (equivalent to 100 W). According to the USB PD Extended Power Range (EPR) protocol, the maximum output power can reach 48V/5 A (i.e., 240 W). According to the IEC61000-3-2 standard, electrical appliances with input power of 75 W or above (meeting Class-D device requirements) must comply with the maximum amplitude limit regulations for line-frequency harmonics up to the 39th harmonic. Therefore, USB PD traveler adaptors with output power of 75 W or more should have a power supply system 100 with a power factor correction (PFC) conversion circuit 10 as shown in FIG. 1A to minimize line-frequency harmonics. For USB PD EPR traveler adaptor applications, a PFC conversion voltage VPFC of, for example, 400V should be generated for a general AC input voltage VAC range, such as from 85 to 265 Vrms, with an adaptor output voltage VDD range of, for example, 5V to 48V, and an adaptor output current IDD range of, for example, 0.5 A to 5 A. From the above specifications, it can be seen that the output power range for current USB PD EPR traveler adaptor applications is quite broad.

One drawback of implementing a USB PD EPR traveler adaptor using the aforementioned prior art power supply system 100 is that, for example, under the premise that the conversion voltage VPFC is fixed at 400V, the power loss of the power supply system 100 is relatively high, resulting in relatively low conversion efficiency, especially when the rectified voltage VBD is relatively low (e.g., 85 Vrms) and/or in applications where the adaptor output voltage VDD (e.g., below 20V) or the output power is relatively low.

Additionally, when the flyback power converter 15 converts the PFC conversion voltage VPFC to the adaptor output voltage VDD, it is difficult for a conventional flyback power converter 15 to achieve zero voltage switching (ZVS) and tends to have higher voltage stress, resulting in lower conversion efficiency and higher costs.

For other related prior arts, please refer to U.S. Pat. Nos. 11,411,489 and 6,768,655.

SUMMARY OF THE INVENTION

From one perspective, the present invention provides a power supply system with power factor correction (PFC), including: an AC rectifier, configured to rectify an AC input power to generate a rectified power, wherein the rectified power includes a rectified voltage; a power factor correction (PFC) conversion circuit, configured to perform a PFC conversion on the rectified power to generate a conversion power, wherein the conversion power includes a conversion voltage; a DC-DC converter, configured to convert the conversion power to generate an adaptor output power, wherein the adaptor output power includes an adaptor output voltage and an adaptor output current; a protocol power delivery (PD) interface, configured to determine the adaptor output power according to protocol information and to control a power path switch therein to transmit the adaptor output power to a power supply pin; and a controller, configured to determine the conversion voltage based on the rectified voltage and the adaptor output voltage.

From another perspective, the present invention provides a control method of a power supply system, including: rectifying an AC input power to generate a rectified power, wherein the rectified power includes a rectified voltage; performing a power factor correction (PFC) conversion on the rectified power to generate a conversion power, wherein the conversion power includes a conversion voltage; converting the conversion power to generate an adaptor output power, wherein the adaptor output power includes an adaptor output voltage and an adaptor output current; determining the adaptor output power according to protocol information and controlling a power path switch to transmit the adaptor output power to a power supply pin; and determining the conversion voltage based on the rectified voltage and the adaptor output voltage.

In one embodiment, when the adaptor output voltage decreases, the controller correspondingly decreases the conversion voltage.

In one embodiment, the controller enables the PFC conversion circuit to perform the PFC conversion when the adaptor output voltage exceeds an enabling threshold, and disables the PFC conversion circuit from performing the PFC conversion when the adaptor output voltage falls below a disabling threshold.

In one embodiment, the controller adjusts the conversion voltage in a linear manner based on the adaptor output voltage.

In one embodiment, the controller further adjusts the conversion voltage based on the adaptor output current.

In one embodiment, the DC-DC converter comprises a flyback converter, an LLC converter, or an active clamp forward converter.

In one embodiment, the flyback converter comprises an asymmetric half-bridge (AHB) flyback converter.

In one embodiment, the controller adjusts the conversion voltage based on the rectified voltage, the adaptor output voltage, and the adaptor output current to optimize a conversion efficiency between the rectified voltage and the adaptor output voltage.

In one embodiment, the controller is configured to use the rectified voltage and the adaptor output voltage as inputs to a predetermined algorithm to determine the conversion voltage to achieve a relatively optimal conversion efficiency.

In one embodiment, the predetermined algorithm includes a lookup table, and the controller selects relatively optimal operating parameters from a pre-stored data table based on the rectified voltage, the adaptor output voltage, and the adaptor output current to adjust the conversion voltage.

The present invention provides a power supply system with power factor correction (PFC) and a control method thereof, wherein the power supply system determines whether to disable a PFC conversion according to an adapter output power. Because the present invention can determine whether to disable a PFC conversion according to an adapter output power, the power loss is reduced, and the conversion efficiency is improved.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies. For better understanding the essence of the present invention, practical implementation details will be described in the embodiments below. It should be understood that such details are not for limiting the broadest scope of the present invention.

Figure 1A:
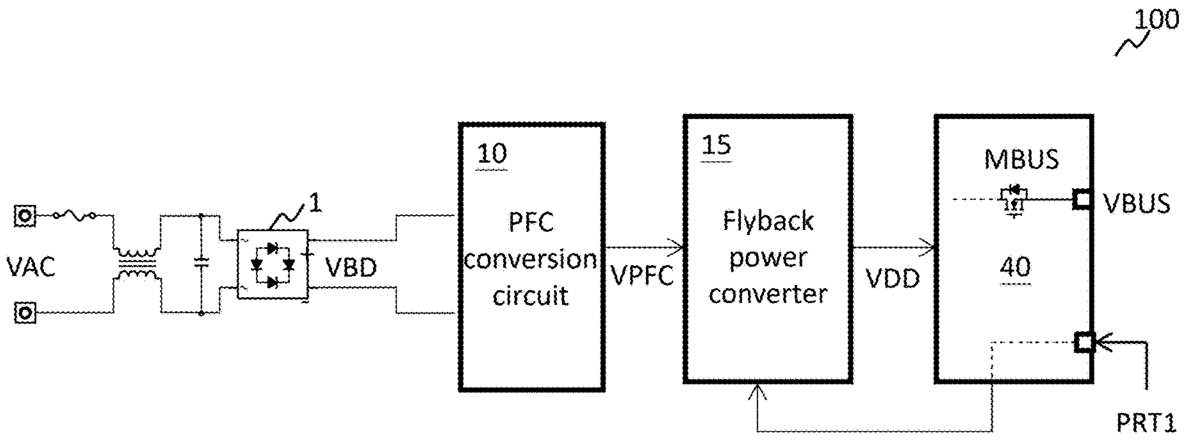
Fig. 1A (prior art)
FIG. 1A is a schematic diagram of a prior art power supply system.
Figure 1B:
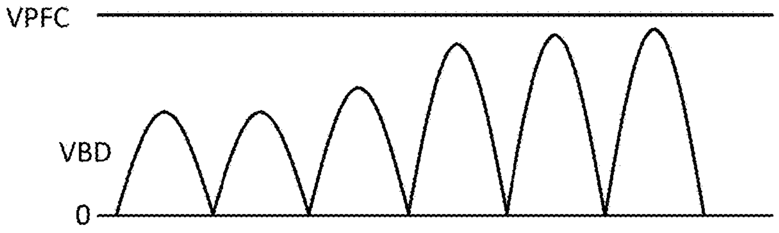
Fig. 1B (prior art)
FIG. 1B is a waveform diagram of the input voltage and output voltage in the prior art power supply system.
Figure 2:
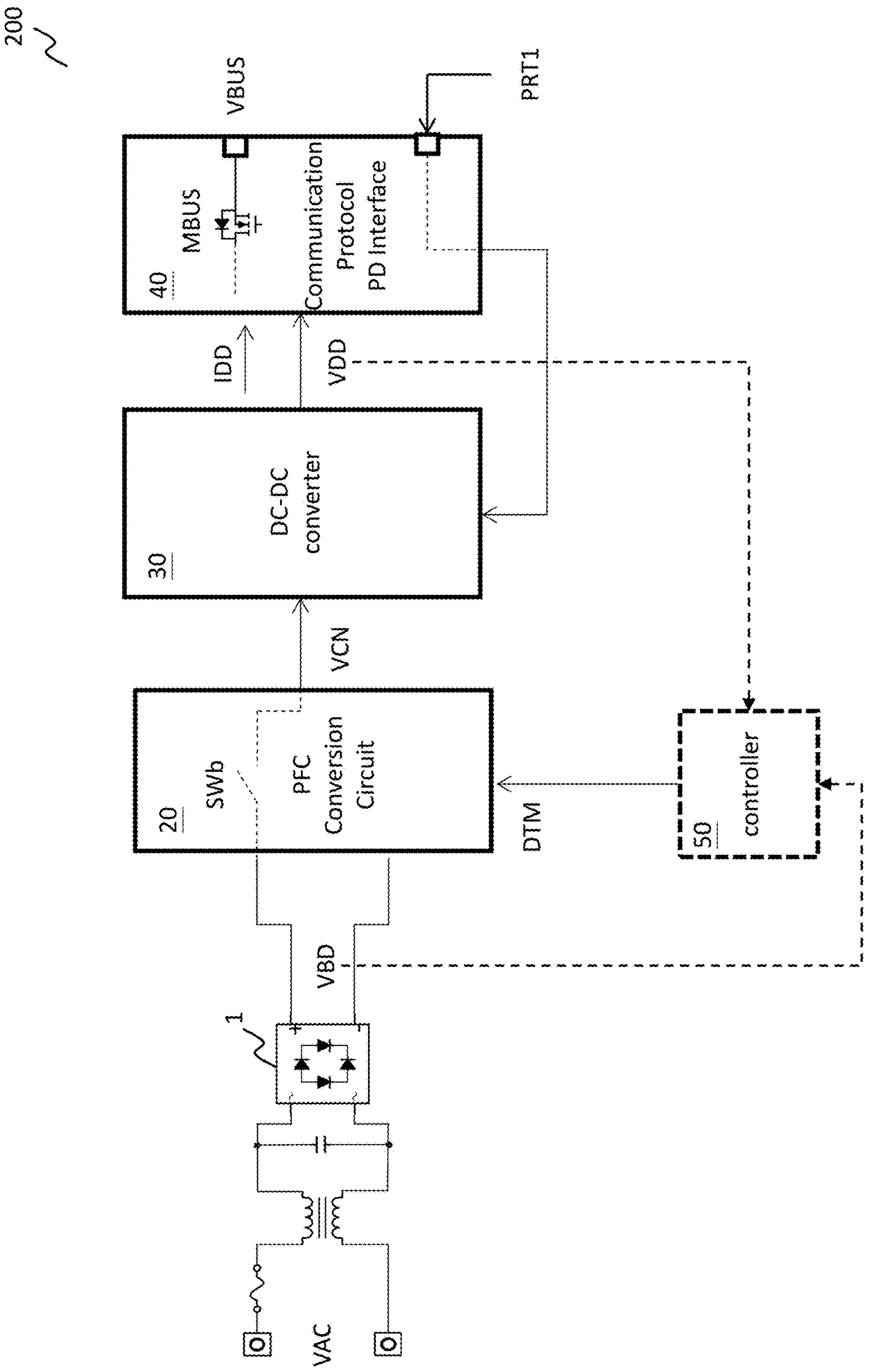
FIG. 2 shows an embodiment of the power supply system with power factor correction according to the present invention.

Please refer to FIG. 2. FIG. 2 shows an embodiment of the power supply system with power factor correction according to the present invention. As shown in FIG. 2, in one embodiment, the power supply system with power factor correction 200 includes: an AC rectifier 1, a power factor correction (PFC) conversion circuit 20, a DC-DC converter 30, a protocol power delivery (PD) interface 40, and a controller 50. In one embodiment, the AC rectifier 1 is configured to rectify an AC input power to generate a rectified power. The AC input power includes an AC input voltage VAC, and the rectified power includes a rectified voltage VBD. The PFC conversion circuit 20 is configured to perform PFC conversion on the rectified power to generate a conversion power, where the conversion power includes a conversion voltage VCN. The DC-DC converter 30 is configured to convert the conversion power into an adaptor output power through DC-DC conversion, where the adaptor output power includes an adaptor output voltage VDD and an adaptor output current IDD.

As shown in FIG. 2, the protocol PD interface 40 is configured to transmit related information to the DC-DC converter 30 based on protocol information PRT1 to determine the adaptor output power. The protocol PD interface 40 controls the power path switch MBUS to transmit the adaptor output power to the power supply pin VBUS, thereby supplying the adaptor output power to an external circuit coupled thereto (not shown). The controller 50 generates a determination signal DTM input to the PFC conversion circuit 20 based on the rectified voltage VBD and the adaptor output voltage VDD to determine the conversion voltage VCN, making the conversion voltage VCN related to the rectified voltage VBD and the adaptor output voltage VDD.

In prior art power supply systems, the conversion voltage VCN is regulated at a fixed level, such as 400V, corresponding to different AC input voltages VAC, for example, 85 Vrms to 265 Vrms, different adaptor output voltages VDD, for example, 5V to 48V, and different adaptor output currents, for example, 0.5 A to 5 A. This causes the conversion efficiency of the prior art power supply systems to vary significantly under different conditions, resulting in overall poor conversion efficiency. One of the distinguishing features of the present invention from the prior art is that, according to the present invention, the controller 50 determines the conversion voltage VCN based on the rectified voltage VBD and the adaptor output voltage VDD to improve conversion efficiency. In one embodiment, the controller 50 further adjusts the conversion voltage VCN based on the adaptor output current IDD to enhance conversion efficiency. According to the present invention, the rectified voltage VBD, adaptor output voltage VDD, and adaptor output current IDD can be comprehensively considered to adjust the conversion voltage VCN or determine whether to enable/disable PFC conversion to improve conversion efficiency Nu.

Figure 3A:
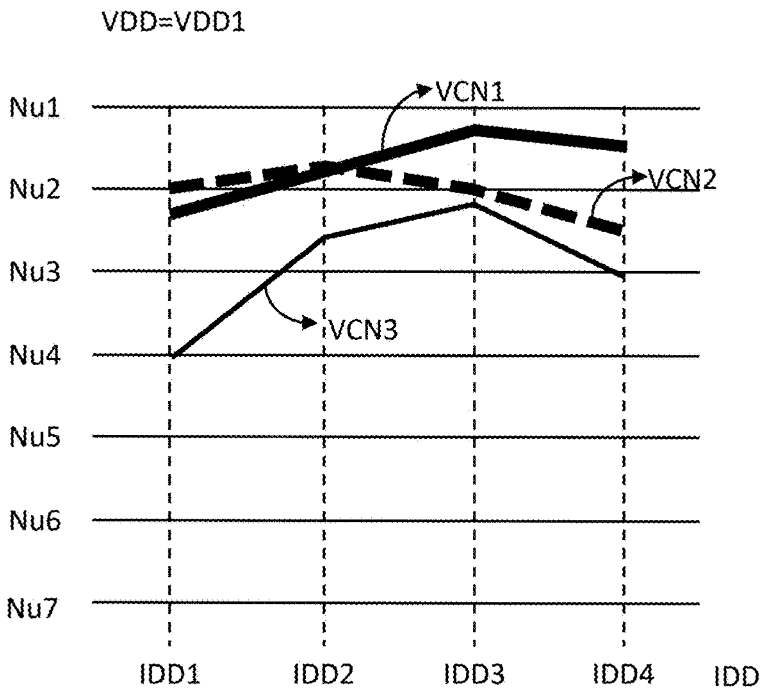
FIGS. 3A, 3B, and 3C show the relationships among the adaptor output voltage VDD, conversion voltage VCN, adaptor output current IDD, rectified voltage VBD, and conversion efficiency Nu.
Figure 3B:
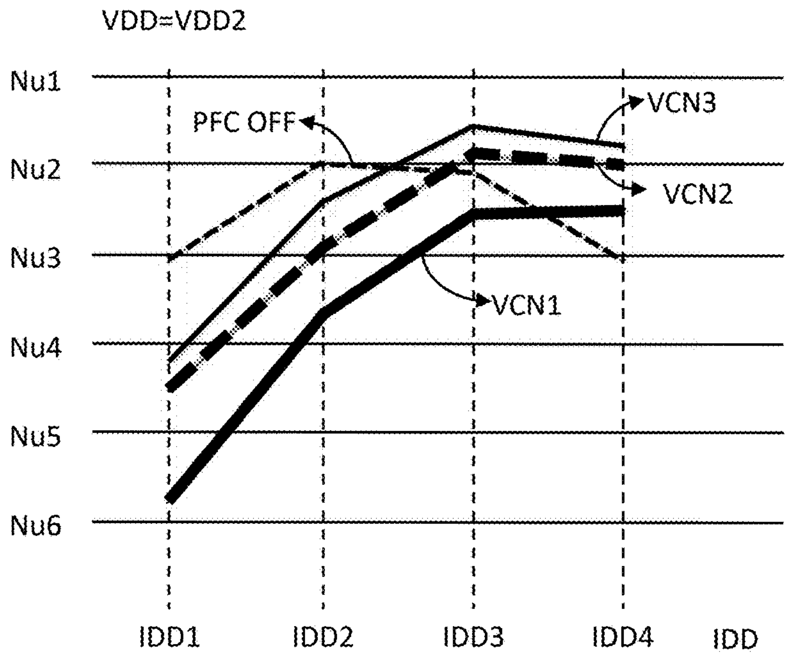
Figure 3C:
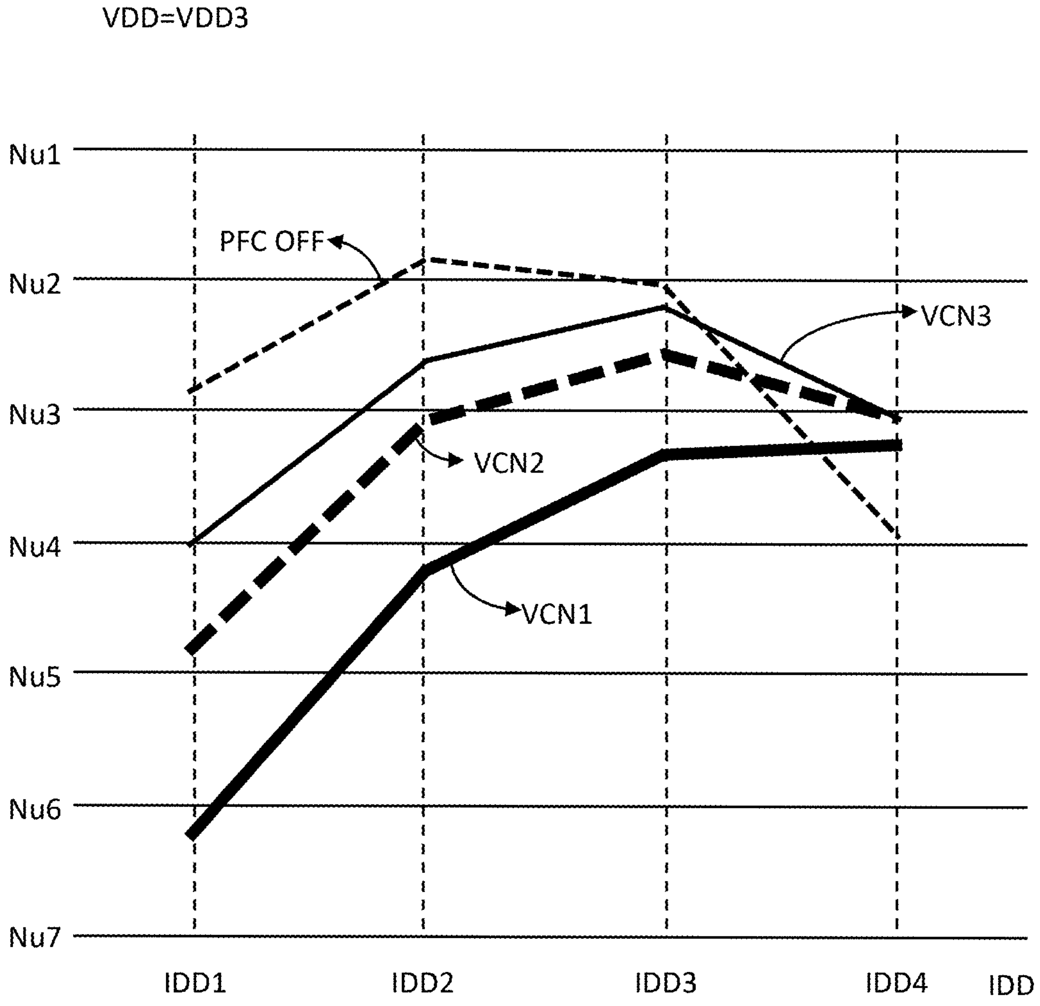

FIGS. 3A, 3B, and 3C respectively show the conversion efficiency Nu between the rectified voltage VBD and the adaptor output voltage VDD at different conversion voltages VCN or when PFC conversion is disabled for different adaptor output currents IDD, when the adaptor output voltage VDD is the adaptor output voltage VDD1, adaptor output voltage VDD2, and adaptor output voltage VDD3. In one embodiment, the adaptor output voltage VDD1 is higher than the adaptor output voltage VDD2, and the adaptor output voltage VDD2 is higher than the adaptor output voltage VDD3; the conversion voltage VCN1 is higher than the conversion voltage VCN2; the adaptor output current IDD1 is lower than the adaptor output current IDD2, and the adaptor output current IDD2 is lower than the adaptor output current IDD3, with the conversion efficiency Nu1 higher than the conversion efficiency Nu2, and so on down to Nu7. In one embodiment, the adaptor output current IDD1 to IDD4 increases in a linear or arithmetic sequence. In one embodiment, the conversion efficiency Nu1 to Nu7 decreases in an arithmetic sequence.

In one embodiment, according to the present invention, when the adaptor output voltage VDD decreases, the controller 50 correspondingly changes the determination signal DTM, causing the PFC conversion circuit 20 to determine a corresponding reduction in the conversion voltage VCN based on the determination signal DTM.

For example, referring to FIGS. 3A and 3B, when the adaptor output voltage VDD1 decreases to the adaptor output voltage VDD2 and the adaptor output current IDD remains at the adaptor output current IDD3, the controller 50 correspondingly changes the determination signal DTM, causing the PFC conversion circuit 20 to reduce the conversion voltage VCN from VCN1 to VCN3 based on the determination signal DTM, thereby achieving higher conversion efficiency Nu.

In one embodiment, the controller 50 adjusts the determination signal DTM to enable PFC conversion when the adaptor output voltage VDD is higher than an enabling threshold and adjusts the determination signal DTM to disable PFC conversion when the adaptor output voltage VDD is lower than a disabling threshold.

For example, referring to FIGS. 3A, 3B, and 3C, when the adaptor output voltage VDD is the adaptor output voltage VDD2 (FIG. 3B) and the adaptor output current IDD remains at IDD1 or IDD2, disabling PFC conversion (PFC OFF) achieves higher conversion efficiency Nu. When the adaptor output voltage VDD increases from VDD2 (FIG. 3B) to VDD1 (FIG. 3A), adjusting the determination signal DTM to enable PFC conversion and setting the conversion voltage VCN to VCN2 achieves higher conversion efficiency Nu. Thus, the enabling threshold is between the adaptor output voltage VDD1 and VDD2 when the adaptor output current is IDD1 or IDD2. Conversely, when the adaptor output voltage VDD decreases from VDD1 (FIG. 3A) to VDD2 (FIG. 3B), and the adaptor output current IDD remains at IDD1 or IDD2, the determination changes from enabling to disabling PFC conversion, with the disabling threshold also between VDD1 and VDD2. The enabling and disabling thresholds may be the same or different values.

In one embodiment, the controller 50 adjusts the conversion voltage VCN in a linear manner based on the adaptor output voltage VDD. In another embodiment, the controller 50 adjusts the conversion voltage VCN to be proportional to the adaptor output voltage VDD.

In one embodiment, the controller 50 further adjusts the conversion voltage VCN based on the adaptor output current IDD. For example, referring to FIG. 3A, when the adaptor output current IDD is IDD1, the controller 50 adjusts the conversion voltage VCN to VCN2 to achieve higher conversion efficiency Nu. When the adaptor output current is IDD4, the controller 50 adjusts the conversion voltage VCN to VCN1 for higher conversion efficiency Nu.

In one embodiment, the DC-DC converter 30 may include, but is not limited to, a flyback converter, an LLC converter, or an active clamp forward converter. In one embodiment, the DC-DC converter 30 may include, but is not limited to, an asymmetric half-bridge (AHB) flyback converter.

In one embodiment, the controller 50 adjusts the conversion voltage VCN based on the rectified voltage VBD, adaptor output voltage VDD, and adaptor output current IDD to optimize the conversion efficiency Nu between the rectified voltage VBD and the adaptor output voltage VDD.

For example, the controller 50 adjusts the conversion voltage VCN based on the rectified voltage VBD, adaptor output voltage VDD, and adaptor output current IDD to optimize the conversion efficiency Nu between the rectified voltage VBD and the adaptor output voltage VDD, as illustrated by the relationships shown in FIGS. 3A, 3B, and 3C.

In one embodiment, the controller 50 determines the conversion voltage VCN by using the rectified voltage VBD and the adaptor output voltage VDD as inputs to a predetermined algorithm to achieve relatively optimal conversion efficiency Nu.

For example, the controller 50 determines or adjusts the conversion voltage VCN to achieve relatively optimal conversion efficiency Nu by using the rectified voltage VBD, adaptor output voltage VDD, and adaptor output current IDD as inputs to a predetermined algorithm, as illustrated by the relationships shown in FIGS. 3A, 3B, and 3C.

In one embodiment, the predetermined algorithm includes a lookup table, and the controller 50 selects relatively optimal operating parameters from a pre-stored data table based on the rectified voltage VBD, adaptor output voltage VDD, and adaptor output current IDD to adjust the conversion voltage VCN.

For example, the controller 50 uses the data on adaptor output voltage VDD, conversion voltage VCN, adaptor output current IDD, rectified voltage VBD, and conversion efficiency Nu, as shown in FIGS. 3A, 3B, and 3C, to create a pre-stored data table. The controller 50 then selects relatively optimal operating parameters from the pre-stored data table based on the values of the rectified voltage VBD, adaptor output voltage VDD, and adaptor output current IDD to determine or adjust the conversion voltage VCN to achieve relatively optimal conversion efficiency Nu.

According to the present invention, in one embodiment, when PFC conversion is disabled, the PFC conversion circuit 20 performs a bypass coupling operation, making the conversion voltage VCN equal to the rectified voltage VBD.

Figure 4:
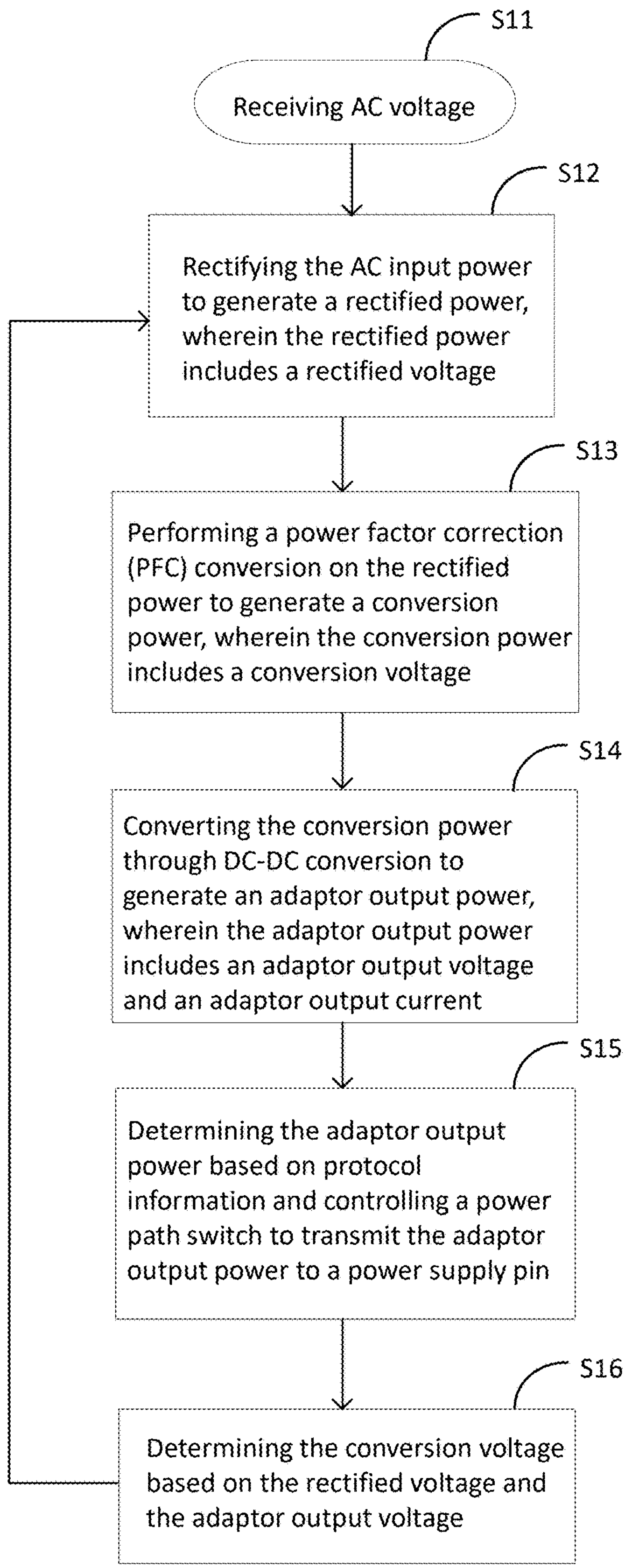
FIG. 4 is a flowchart of an embodiment of the power factor correction conversion circuit in the power supply system of the present invention.

FIG. 4 shows an embodiment of the present invention, illustrating an implementation of the power supply system control method according to the present invention. As shown in FIG. 4, the power supply system control method includes:

Step S11: Receiving AC voltage.

Step S12: Rectifying the AC input power to generate a rectified power, wherein the rectified power includes a rectified voltage.

Step S13: Performing a power factor correction (PFC) conversion on the rectified power to generate a conversion power, wherein the conversion power includes a conversion voltage.

Step S14: Converting the conversion power through DC-DC conversion to generate an adaptor output power, wherein the adaptor output power includes an adaptor output voltage and an adaptor output current.

Step S15: Determining the adaptor output power based on protocol information and controlling a power path switch to transmit the adaptor output power to a power supply pin.

Step S16: Determining the conversion voltage based on the rectified voltage and the adaptor output voltage.

In one embodiment, the step of performing a PFC conversion on the rectified power to generate a conversion power includes enabling PFC conversion when the adaptor output voltage exceeds an enabling threshold and disabling PFC conversion when the adaptor output voltage falls below a disabling threshold.

In one embodiment, the power supply system control method further includes adjusting the conversion voltage based on the rectified voltage, the adaptor output voltage, and the adaptor output current to optimize the conversion efficiency between the rectified voltage and the adaptor output voltage.

In one embodiment, the power supply system control method further includes determining the conversion voltage using the rectified voltage and the adaptor output voltage as inputs to a predetermined algorithm to achieve relatively optimal conversion efficiency.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system with power factor correction (PFC), comprising:

an AC rectifier, configured to rectify an AC input power to generate a rectified power, wherein the rectified power includes a rectified voltage;

a power factor correction (PFC) conversion circuit, configured to perform a PFC conversion on the rectified power to generate a conversion power, wherein the conversion power includes a conversion voltage;

a DC-DC converter, configured to convert the conversion power to generate an adaptor output power, wherein the adaptor output power includes an adaptor output voltage and an adaptor output current;

a protocol power delivery (PD) interface, configured to determine the adaptor output power according to protocol information and to control a power path switch therein to transmit the adaptor output power to a power supply pin; and a controller, configured to determine the conversion voltage based on the rectified voltage and the adaptor output voltage, wherein the controller is configured to use the rectified voltage and the adaptor output voltage as inputs to a predetermined algorithm to determine the conversion voltage to achieve a relatively optimal conversion efficiency, and wherein the predetermined algorithm includes a lookup table, and the controller selects relatively optimal operating parameters from a pre-stored data table based on the rectified voltage, the adaptor output voltage, and the adaptor output current to adjust the conversion voltage.

2. The power supply system with power factor correction as claimed in claim 1, wherein when the adaptor output voltage decreases, the controller correspondingly decreases the conversion voltage.

3. The power supply system with power factor correction as claimed in claim 1, wherein the controller enables the PFC conversion circuit to perform the PFC conversion when the adaptor output voltage exceeds an enabling threshold, and disables the PFC conversion circuit from performing the PFC conversion when the adaptor output voltage falls below a disabling threshold.

4. The power supply system with power factor correction as claimed in claim 1, wherein the controller adjusts the conversion voltage in a linear manner based on the adaptor output voltage.

5. The power supply system with power factor correction as claimed in claim 4, wherein the controller further adjusts the conversion voltage based on the adaptor output current.

6. The power supply system with power factor correction as claimed in claim 1, wherein the DC-DC converter comprises a flyback converter, an LLC converter, or an active clamp forward converter.

7. The power supply system with power factor correction as claimed in claim 6, wherein the flyback converter comprises an asymmetric half-bridge (AHB) flyback converter.

8. The power supply system with power factor correction as claimed in claim 1, wherein the controller adjusts the conversion voltage based on the rectified voltage, the adaptor output voltage, and the adaptor output current to optimize a conversion efficiency between the rectified voltage and the adaptor output voltage.

9. A control method of a power supply system, comprising:

rectifying an AC input power to generate a rectified power, wherein the rectified power includes a rectified voltage;

performing a power factor correction (PFC) conversion on the rectified power to generate a conversion power, wherein the conversion power includes a conversion voltage;

converting the conversion power to generate an adaptor output power, wherein the adaptor output power includes an adaptor output voltage and an adaptor output current;

determining the adaptor output power according to protocol information and controlling a power path switch to transmit the adaptor output power to a power supply pin;

determining the conversion voltage based on the rectified voltage and the adaptor output voltage; and determining the conversion voltage using the rectified voltage and the adaptor output voltage as inputs to a predetermined algorithm to achieve a relatively optimal conversion efficiency;

wherein the predetermined algorithm includes a lookup table, and the lookup table is used to select relatively optimal operating parameters from a pre-stored data table based on the rectified voltage, the adaptor output voltage, and the adaptor output current to adjust the conversion voltage.

10. The control method of controlling a power supply system as claimed in claim 9, wherein when the adaptor output voltage decreases, the conversion voltage correspondingly decreases.

11. The control method of controlling a power supply system as claimed in claim 9, wherein the step of performing a PFC conversion on the rectified power to generate a conversion power comprises: enabling the PFC conversion when the adaptor output voltage exceeds an enabling threshold, and disabling the PFC conversion when the adaptor output voltage falls below a disabling threshold.

12. The control method of controlling a power supply system as claimed in claim 9, wherein the conversion voltage is adjusted in a linear manner based on the adaptor output voltage.

13. The control method of controlling a power supply system as claimed in claim 12, wherein the conversion voltage is further related to the adaptor output current.

14. The control method of controlling a power supply system as claimed in claim 9, further comprising: adjusting the conversion voltage based on the rectified voltage, the adaptor output voltage, and the adaptor output current to optimize a conversion efficiency between the rectified voltage and the adaptor output voltage.

15. A power supply system with power factor correction (PFC), comprising:

an AC rectifier, configured to rectify an AC input power to generate a rectified power, wherein the rectified power includes a rectified voltage;

a power factor correction (PFC) conversion circuit, configured to perform a PFC conversion on the rectified power to generate a conversion power, wherein the conversion power includes a conversion voltage;

a DC-DC converter comprising an asymmetric half-bridge (AHB) flyback converter, configured to convert the conversion power to generate an adaptor output power, wherein the adaptor output power includes an adaptor output voltage and an adaptor output current; and a controller, configured to determine the conversion voltage based on the rectified voltage and the adaptor output voltage, wherein the controller adjusts the conversion voltage in a linear manner based on the adaptor output voltage and the adaptor output current;

wherein the controller is configured to use the rectified voltage and the adaptor output voltage as inputs to a predetermined algorithm to determine the conversion voltage to achieve a relatively optimal conversion efficiency, and wherein the predetermined algorithm includes a lookup table, and the controller selects relatively optimal operating parameters from a pre-stored data table based on the rectified voltage, the adaptor output voltage, and the adaptor output current to adjust the conversion voltage.

16. The power supply system with power factor correction as claimed in claim 15, further comprising a protocol power delivery (PD) interface configured to determine the adaptor output power according to protocol information and to control a power path switch therein to transmit the adaptor output power to a power supply pin.

17. The power supply system with power factor correction as claimed in claim 15, wherein the controller enables the PFC conversion circuit to perform the PFC conversion when the adaptor output voltage exceeds an enabling threshold, and disables the PFC conversion circuit from performing the PFC conversion when the adaptor output voltage falls below a disabling threshold.

18. The power supply system with power factor correction as claimed in claim 15, wherein when the adaptor output voltage decreases, the controller correspondingly decreases the conversion voltage.

* * * * *